United States Patent [19]

Platzer, Jr.

[11] 4,303,050

[45] Dec. 1, 1981

[54] HEATED FLOW DIRECTOR

[75] Inventor: George E. Platzer, Jr., Troy, Mich.

[73] Assignee: Chrysler Corporation, Highland Park, Mich.

[21] Appl. No.: 93,364

[22] Filed: Nov. 13, 1979

[51] Int. Cl.³ .......................................... F02M 31/00
[52] U.S. Cl. .................................. 123/549; 261/142; 123/548
[58] Field of Search ............... 123/548, 537, 549, 590, 123/552; 261/142

[56] References Cited

U.S. PATENT DOCUMENTS

| | | | |
|---|---|---|---|
| 1,096,989 | 5/1914 | Bentley | 123/549 |
| 1,262,317 | 4/1918 | Finney | 123/590 |
| 3,805,492 | 4/1974 | King | 123/537 |
| 4,031,875 | 6/1977 | Tyler | 123/590 |
| 4,106,457 | 8/1978 | Totten | 123/590 |
| 4,108,127 | 8/1978 | Marcoux | 123/549 |
| 4,141,327 | 2/1979 | Marcoux | 261/142 |

Primary Examiner—Ronald H. Lazarus
Attorney, Agent, or Firm—Newtson & Dundas

[57] ABSTRACT

In a typical vehicle intake manifold on which is mounted a carburetor, a fluid flow director is used to turn the initial downward flow of fuel and air into a lateral direction while simultaneously transmitting heat energy to the fluid for more complete fuel evaporation. The flow director is designed to apportion fuel-air flow over all the face surfaces of several parallel spaced plate members. Except for the lowest or most remote plate member from the fluid inlet, the plates have apertures therein, the diameters of which progressively decrease with greater spacing of the plates from the manifold inlet. The plates are preferably of a ceramic material having a positive temperature coefficient or PTC which is characterized by relatively low electrical resistance at ambient temperatures, but much higher resistance at temperatures corresponding to engine operating temperatures.

1 Claim, 3 Drawing Figures

HEATED FLOW DIRECTOR

This invention relates to a heated flow director for use in a vehicle intake manifold with structures designed to apportion the flow over surfaces of several plates which are preferably of PTC material suitable for electrical resistance heating.

Presently enacted regulations established by Congress and implemented by the Environmental Protection Agency require the reduction of unburned hydrocarbon emissions to incredibly small quantities as compared to unregulated engines. An earlier addition of catalytic converters to vehicles has effectively reduced these emissions. However, emission of hydrocarbons and carbon monoxide during the period including starting and engine warm-up is still a concern. During this period, the mixture is normally rich and the carburetor and intake manifold passages are cool. Fuel thus tends to form relatively large fuel droplets and even condense on cool walls rather than assume the desired form of fine droplets or a vapor mixture. A leaner start and warm-up mixture could be utilized if vaporization of fuel is promoted. Consequently, hydrocarbon and carbon-monoxide emissions would be reduced and fuel economy would be better.

During engine starting and warm-up periods, it is desirable to provide a heat source to promote vaporization of fuel and particularly the lighter components of gasoline. This would prevent the undesirable passage of large quantities of liquid fuel to the combustion chambers where it is essentially wasted. It is known heretofore to use an electrical heater to increase flow temperature and specific forms of known heaters vary. The preferred form of heater in this application utilizes numerous space plate members of a ceramic material, characterized by a positive temperature coefficient or PTC. This material exhibits a low resistance to electrical current when at ambient temperatures but greatly increased resistance at higher temperatures. The resistance of the material changes rapidly within a small temperature band. By imposing an electrical potential between the surfaces of ceramic plate members, the plates become self regulating heating elements. The spaced plates are stacked in parellism and configured to apportion flow evenly over the plates by means of apertures in each plate except perhaps the bottom one. The size of the aperture is decreased proportional to remoteness from the manifold inlet.

The fluid flow direction from the inlet of the manifold is axially downward through aligned apertures of the plate members. The uppermost plate member in closest proximity to the inlet has the largest aperture and therefore a relatively small portion of the flow is directed or drawn laterally thereby. The apertures become increasingly smaller with increased remoteness from the inlet. Thus the bottom or most remote plate may have only a very small aperture or preferably no aperture. Consequently, the most remote plate has a large peripheral surface area best adapted to engage and heat liquid fuel landing thereon. The other plates have proportionately less surface area. This is desirable because the fluid reaching the more remote plates usually carries an increasingly disproportionate quantity of larger liquid fuel droplets partially because of the inertial tendency for heavier particles to continue in a straight path. The lower plates have the needed surface area capable of more completely vaporizing liquid fuel.

Thus, it is apparent that an advantageous feature and object of the present invention is to provide a flow directing structure located downstream from the intake of the intake manifold. The structure preferably is of a PTC ceramic material so as to impart heat energy to liquid fuel particularly during starting and warm-up modes of engine operation. The structure includes parallel but spaced plate members having central apertures designed to pass fluid flow and with the aperture diameters decreasing with increased remoteness from the fluid inlet to better apportion flow over the plates and to provide larger heating surfaces for remote plates which intercept greater portions of liquid fuel.

Other advantageous features and objects of the present invention will be more readily apparent after a reading of the following detailed description, reference being had to the accompanying drawings in which preferred embodiments are illustrated.

Figure 1:
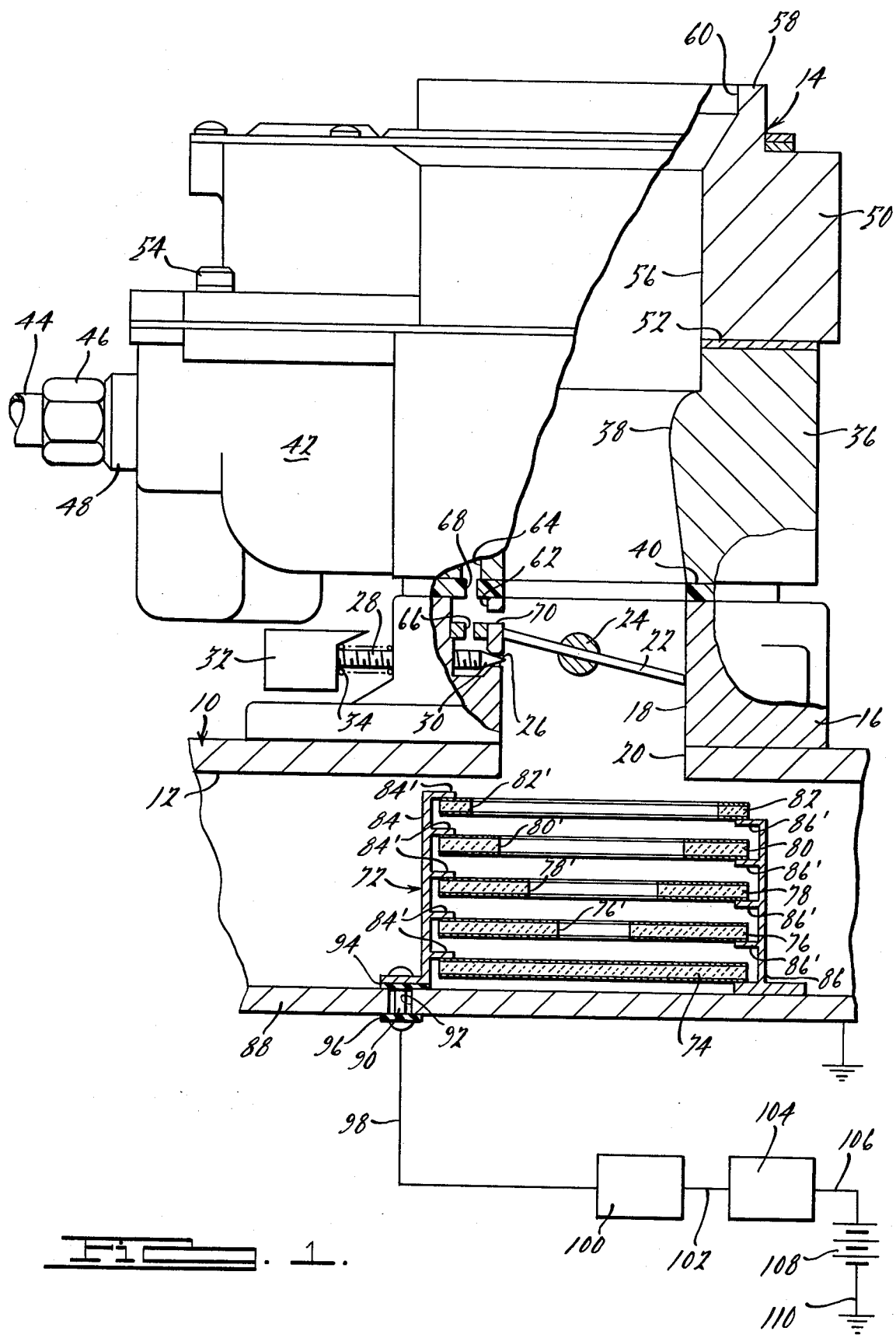
FIG. 1 is a fragmentary elevational view of a vehicle intake manifold and carburetor partially broken away to reveal interior portions thereof and including the subject heated flow director.

In FIG. 1 a portion of a vehicle intake manifold 10 is shown. Manifold 10 defines an air-fuel passage 12 extending from an air-fuel mixture device such as a carburetor 14 to cylinders of an internal combustion engine (not visible). The carburetor 14 includes a throttle body portion 16 which is fastened to the intake manifold 10 in a conventional manner. The member 16 has a central opening 18 aligned with opening 20 in the intake manifold 10. Throttle member 16 also supports a blade type throttle control 22 which is mounted for pivotal movement upon a shaft 24. In FIG. 1, the throttle blade 22 and shaft 24 are illustrated in the near closed or idle mode position. In this position, a supplemental air-fuel mixture enters the intake manifold through an idle port 26 under flow control of a needle valve 28. The idle mixture valve 28 may be adjusted by rotating portion 32 which causes the threaded mid-portion of the member 28 to screw axially inward and outward with respect to the throttle body. A spring 34 maintains the threads in frictional engagement so that a selective setting will not change because of engine vibrations.

Located immediately above the throttle is the body 36 of carburetor 14 which defines a constricted throat portion or venturi 38 through which flows substantial quantities of air when the throttle 22 is moved from its near closed position. The constricted venturi increases the air velocity and decreases air pressure. This pressure decreases or vacuum causes fuel to be drawn or otherwise pass from a supply portion or fuel bowl 42 of the carburetor into the airstream in small droplet form. To prevent undesired leakage of air into the air-fuel mixture, a gasket member 30 is placed between the throttle portion 16 and the carburetor body portion 36. The carburetor body 36 defines the fuel bowl 42 to which fuel is supplied from a fuel tank (not shown) through a conduit 44. Conduit 44 is attached by a fitting 46 to an inlet portion 48 of the carburetor fuel bowl. Normally in a vehicle, a fuel pump transfers the fuel under pressure to the carburetor inlet. In a conventional manner, a desired level of fuel is maintained in the bowl 42 by a float and needle valve combination (not visible) which coacts with the inlet 48 to automatically maintain the desired level.

Finally, an air horn portion 50 is fastened to the main body portion 36 and sealed thereto by a gasket member 52. Fasteners 54 (only one of which is shown) secures portion 50 to portion 36. The air horn 50 includes an air inlet passage 56 of greater diameter than the restricted throat or venturi portion 38 and an upstanding flange portion 58 serves to define as an entrance or inlet for air to the carburetor. The flange 58 is normally adapted to receive the central outlet opening of an air cleaner which usually contains a filter element to prevent dirt and other foreign objects from entering the carburetor. All of this is conventional in the carburetor art.

In an earlier paragraph, the operation of the carburetor was described during an engine idle condition in which the throttle blade 22 and shaft 24 are set in a near closed position shown in FIG. 1. For a more complete understanding, it should be noted that the throttle body 16 and main body portion 36 have vertically extending idle well portions 62 and 64 through which air and fuel pass to the idle port 26. A small diameter orifice 66 immediately above the port 26 and valve member 28 helps regulate the flow of the air-fuel mixture. An opening 68 in the gasket 40 connects portions 62, 64. As the throttle blade 22 opens and its leftward edge moves upward and away from the wall 18, a portion of the air-fuel mixture is drawn through a transfer slot or port 70. This additional fuel passing through the transfer port 70 improves the engine power and response at a time when the vehicle is normally accelerating from a stationary position.

The aforedescribed carburetor device has been explained with reference to the drawings. It should be understood that this carburetor type fuel/air introducing apparatus is not essential to the subject flow director. Other apparatus such as the EFM (Electronic Fuel Metering) device on the throttle body injection type device could also be used to introduce a mixture of fuel and air to the manifold. However, all known introduction devices share the same problem as the carburetor during start and warm up modes, namely presence of liquid fuel rather than vaporous fuel.

Vehicles are normally designed to operate most efficiently at a desirably high operating temperature, usually at a coolant temperature of about 180°–220° F. Operation of the vehicle at cooler temperatures such as after a cold engine is started, result in inefficiencies. Particularly with regard to an air-fuel intake device such as the carburetor and intake manifold, operation during the warm-up period often results in the presence of liquid fuel in the intake manifold. Because of this fuel loss from the mixture, a richer mixture is normally required to operate a cold engine. Due to recent large increases in fuel prices and the greater emphasis on decreased engine emissions, it is economically desirable to improve the efficiencies of engines even during this short start and warm-up period.

The subject invention utilizes a heated flow director 72 which is mounted in the passage 12 below inlet opening 20. Basically, the heated flow director 72 comprises a plurality of parallel, spaced plate members 74,76,78,80 and 82. The plate members are supported at diametrically opposite edge portions as shown in FIG. 1, by a pair of conductive members 84 and 86. The members 84 and 86 are attached to the lower wall 88 of the intake manifold as shown in FIG. 1. Included are a number of offset tab portions 84' and 86' which extend from members 84,86 to supportingly engage surfaces of the plate members 74–82. The supports 84,86 are shown for illustrative purposes only. Other arrangements are possible and a single frame support might be highly desirable.

Figure 3:
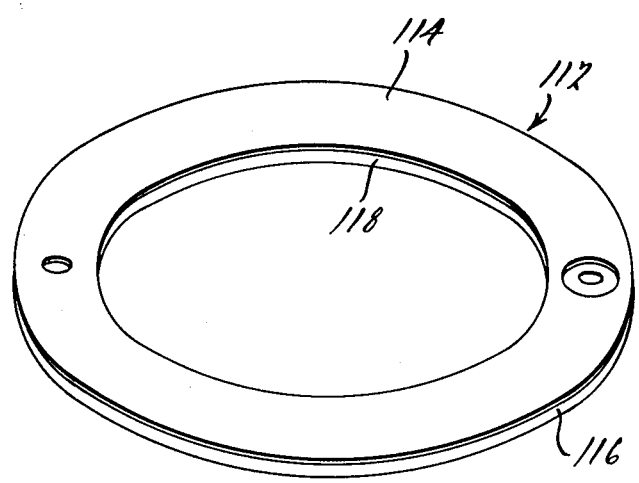
FIG. 3 is a perspective view of one of the plate members shown in FIG. 2.

A typical plate member of the illustrated embodiment has a generally circular shape with a thickness substantially less than the diameter as shown in FIG. 3. The lowermost or bottom plate 74 has an unbroken surface whereas the plates 76–82 are provided with central apertures 76', 78', 80' and 82'. The apertures are dimensioned so that with increased distance from the bottom plate 74, the diameter of the apertures progressively increases.

Plate members 74–82 are of a positive temperature coefficient (PTC) ceramic material which has a variable resistance to electrical current. The plate resistance remains essentially constant and quite low in a low range of temperatures but increases rapidly in a narrow temperature range. In a higher temperature range the resistance is maintained at a high but relatively stable level. At temperatures experienced during an initial engine starting and warm-up, the members 74–82 initially have a low resistance and the application of an electrical potential thereacross causes a high current flow with a consequent increase in plate temperature. At a temperature of about 125° C. the plate resistance begins to increase at a rapid rate. Further application of the electrical potential thereacross produces a lower current and hence less energy is supplied to the plate. To provide an electrical potential across the upper and lower surfaces of each plate member the plates are coated with a metallic material. Opposite surfaces are then connected to opposite pluralities of an electrical potential. In FIG. 1, the connection to an electrical potential is achieved through supports 84,86 and tab portions 84' and 86'.

Before proceeding further with the detailed description of the embodiment, a short description of the PTC material follows: The plate may be formed of a lanthanum-doped barium titanate ceramic resister material. It has a positive temperature coefficient of resistivity and is adapted to display a sharp, anomalous increase in resistivity when heated to a selected temperature. A ceramic titanate having the empirical formula of $Ba_{0.968} Pb_{0.030} La_{0.002} Ti O_3$ is contemplated. It has a Curie temperature of about 140° C. and is adapted to display a sharp, anomalous increase in resistivity from a room temperature resistivity of about 36 ohm - centimeters to a high temperature resistivity of about $10^5$ ohm - centimeters when heated above its anomaly temperature to about 200° C.

It now should be observed that support member 84 is insulated from manifold 88 by use of a rivet-like fastener 90 extending through an over large opening 92 so as not to contact the bottom wall 88. Non-conductive washer members 94,96 isolate the rivet 90 from the wall 88. The other support member 86 is connected to the manifold directly and forms a ground for the heated flow director. A lead or conductor 98 extends from fastener 90 to a temperature responsive switching member 100 which may be employed to open the heater circuit once the engine warm-up period is completed. Conductor 102 connects switch 100 to an ignition switch 104 which in turn is connected by conductor 106 to the vehicle battery 108. To anticipate engine starting, the ignition switch could be deleted in the circuit and a door operated or seat switch substituted. This would activate the heating circuit as soon as the door is opened or the driver sits on the seat. The battery 108 is ground in a conventional manner by conductor 110. Thus, when switch 104 is closed a heater circuit is applied to the flow director through the support 84 and tabs 84' thereon. Tabs 84' connect to the upper conductive surfaces of the plate members 74–82. The lower conductive surface of the plates connect to tabs 86'. Tabs 86' and support 86 are connected to ground. An electrical potential then extends across the thickness of the plate members. Resultantly, the plates are connected in parallel so that the same potential is applied across each plate. This provides more even heating of all the plates.

The fuel-air mixture from the carburetor first passes downward through opening 20 and then the flow must change direction. Normally absent the subject deflector, the flow is directed against the bottom wall 88 of manifold 10. The temperature of the bottom wall 88 would normally be substantially ambient upon starting a cold engine. This relatively cool temperature would not produce any vaporization of the fuel. The subject heated flow director is placed between wall 88 and the opening 20 to cause portions of the fuel flow to impinge upon the heated surfaces of the plates. The progressively larger apertures encountered by the fluid flow nicely divides and apportions the fuel flow among the plates to produce even and efficient heating and fuel vaporization. The plates also redirect the flow of air from its downward initial direction to its lateral orientation for flow to the cylinders. The heat energy imparted to the liquid fuel during warm-up helps maintain a properly rich air-fuel ratio and relieves the necessity for excessive choking which is the conventional manner of engine operation during start and warm-up periods.

Figure 2:
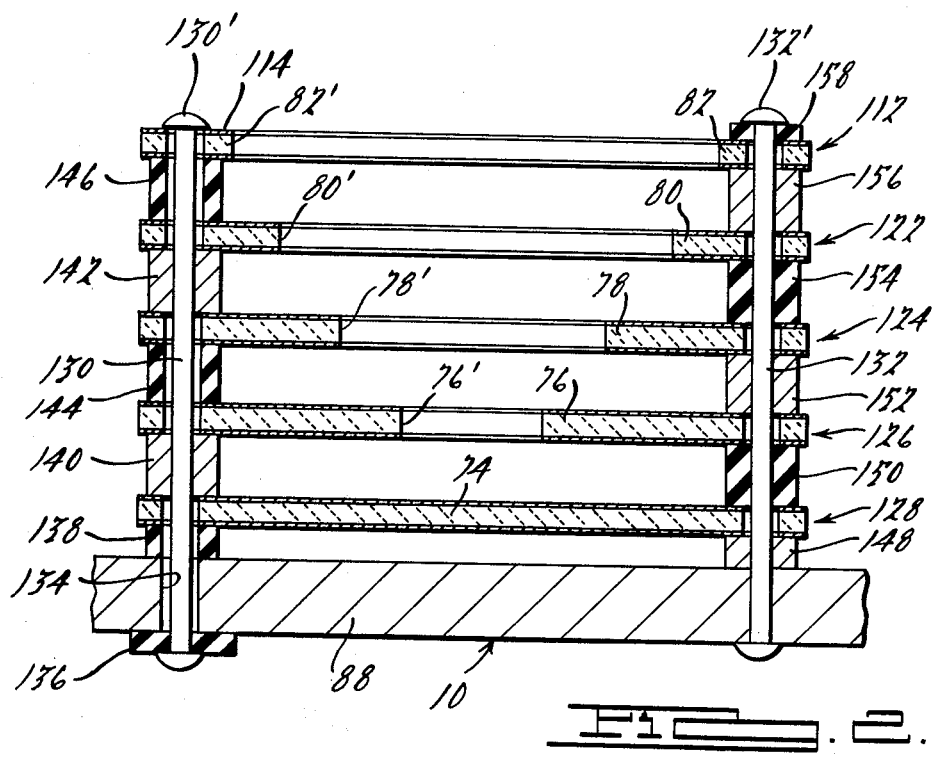
FIG. 2 is an enlarged fragmentary view of a second embodiment of the heated flow director.

It should be noted there are other ways to configure and assemble the various plate members. In FIGS. 2 and 3 of the drawings, another embodiment of the heated flow assembly is illustrated and in FIG. 3, a particular plate member 112 is illustrated. It has an upper coating 114 of metallic material such as copper and a core 116 of positive temperature coefficient type material. Not visible is the metallic coating on the bottom surface of plate 112. The relatively large central aperature 118 of plate 112 would suggest that this plate is the uppermost plate member of the assembly shown in FIG. 2. Reference to FIG. 2 confirms this and illustrates plate member 112 in parallel, but spaced relationship with four other plate members 122, 124, 126 and 128. The plates are supported and spaced from the bottom wall 88 by elongated rivet-like fastener-conductors 130 and 132. The fastener-conductor 130 is isolated from the manifold 10 by extension through an enlarged opening 134 and the use of non-conductive washer members 136 and 138. The fastener-conductor 130 is electrically connected to the upper surface of member 128 and the lower surface of member 126 by a conductive spacer member 140. Likewise, the upper surface of member 124 and the lower surface of member 122 is connected to fastener-conductor 130 by a like conductive spacer member 142. The upper surface 114 of member 112 is directly connected to the head portion 130' of member 130. The lower surface of the plate 128 is isolated by non-conductive spacer 138 and likewise the upper surface of member 126 and lower surface of 124 are isolated by non-conductive spacer 144. Likewise, the upper surface of member 122 and lower surface of member 112 are isolated by non-conductive spacer 146.

Referring now to the righthand fastener-conductor 132 shown in FIG. 2, the lower surface of member 128 is ground connected to the manifold 88 by a conductive spacer 148. The upper surface of member 128 and lower surface of member 126 is isolated therefrom by a non-conductive spacer 150. The upper surface of member 126 and a lower surface of member 124 are connected to the member 132 by conductive spacer 152. The upper surface of member 124 and the lower surface of member 122 are isolated by non-conductive spacer 154. The upper surface of member 122 and the lower surface of member 112 are connected to member 132 by conductive spacer 156. Finally, the upper surface 114 of plate member 112 is isolated by a non-conductive washer 158 which is engaged by a head portion 132' of member 132.

Rather than space members 130,132 centrally in the enlarged openings of the plate members as shown in FIG. 2, the spacers could be configured with annular portions extending into the openings and between the plates and members 130,132. In addition to using PTC as the heating elements, it is also within the scope of the invention to use other heat sources for the combined heating and flow directing plates. For example, either resistance heating wire such as michrome, or a deposited resistive film such as tin oxide or other metalic or oxide film might be used as the heating elements. In this case, a temperature sensor and an external current controller would be required. This slight modification and others surely fall within the scope of this invention which is defined by the following claims.

I claim:

1. In association with a vehicle intake manifold having an inlet permitting the entry of fluid flowing in one direction and outlet means permitting discharge of fluid flowing in a direction lateral to the entry direction so that the direction of fluid flow abruptly changes, a fluid flow director assembly, comprising:

a series of thin plate members extending in substantial parallelism normal to the one fluid flow direction, the plates being spaced one from another to form flow passages along the plate surfaces and in the lateral flow direction;

the plate member being of a positive temperature coefficient material characterized by rapid changes in electrical resistivity corresponding to temperature changes over a small range;

means permitting the fluid flow to be apportioned over the various plate members as the flow changes from the one direction to the lateral direction, the means including formation of some of the plate members in a washer-like configuration with a peripheral annularity formed about a central open region whereby portions of fluid flow pass through the central regions and other portions pass laterally between and over the surfaces of the annularities;

the plates having peripheral annularities of varying widths, the plate most proximate to the inlet being the narrowest and the plate most remote from the inlet being the widest so as to more evenly apportion flow over the heated surfaces of the several plates;

plate heating means for energizing the positive temperature coefficient ceramic material of the plates to impart heat to liquid fuel which contacts the plate and to thereby vaporize the liquid;

circuit means including an electrical potential connected to the plate heating means.

* * * * *